SOLID STATE OXYGEN GAUGE

Filed Nov. 5, 1968

WITNESSES

Theodore F. Wrobel

Michael P. Lynch

INVENTORS
Armand J. Panson
and Roswell J. Ruka
BY C. F. Renz
ATTORNEY

United States Patent Office 3,558,280
Patented Jan. 26, 1971

3,558,280
SOLID STATE OXYGEN GAUGE

Armand J. Panson and Roswell J. Ruka, Pittsburgh, Pa., assignors to Westinghouse Electric Corporation, Pittsburgh, Pa., a corporation of Pennsylvania
Filed Nov. 5, 1968, Ser. No. 773,466
Int. Cl. G01n *31/06*
U.S. Cl. 23—254 10 Claims

ABSTRACT OF THE DISCLOSURE

An oxygen gauge which includes a solid state oxygen sensitive element in the form of a mixed valence oxide compound that exhibits a change in electrical resistance as a function of the change in the oxygen partial pressure of a sample gas.

BACKGROUND OF THE INVENTION

Field of the invention

This invention is related in general to oxygen measuring devices and in particular to a solid state device which responds to a change in oxygen partial pressure by changing electrical resistance.

Description of the prior art

The application of solid state oxygen sensors presently available has been restricted by inherent limitations of the available devices. Three factors which contribute to the lack of success of these devices are the requirement for the operating temperatures in excess of 800° C., a relatively narrow oxygen stoichiometry range and therefore limited oxygen sensing range, and requirement to utilize substantially pure sensor elements.

SUMMARY OF THE INVENTION

This invention utilizes a mixed valence oxide compound of a significantly wide oxygen stoichiometry range which when operating at a temperature of approximately 350° C. exhibits a notable resistance change as a function of change in oxygen partial pressure. The wide oxygen stoichiometry range produces numerous oxygen vacancies which not only enable oxygen measurement over a wide oxygen pressure range but renders the oxygen sensor insensitive to small amounts of impurities in the sensor compound and the sample gas being monitored.

DESCRIPTION OF THE PREFERRED EMBODIMENT

Figure 1:
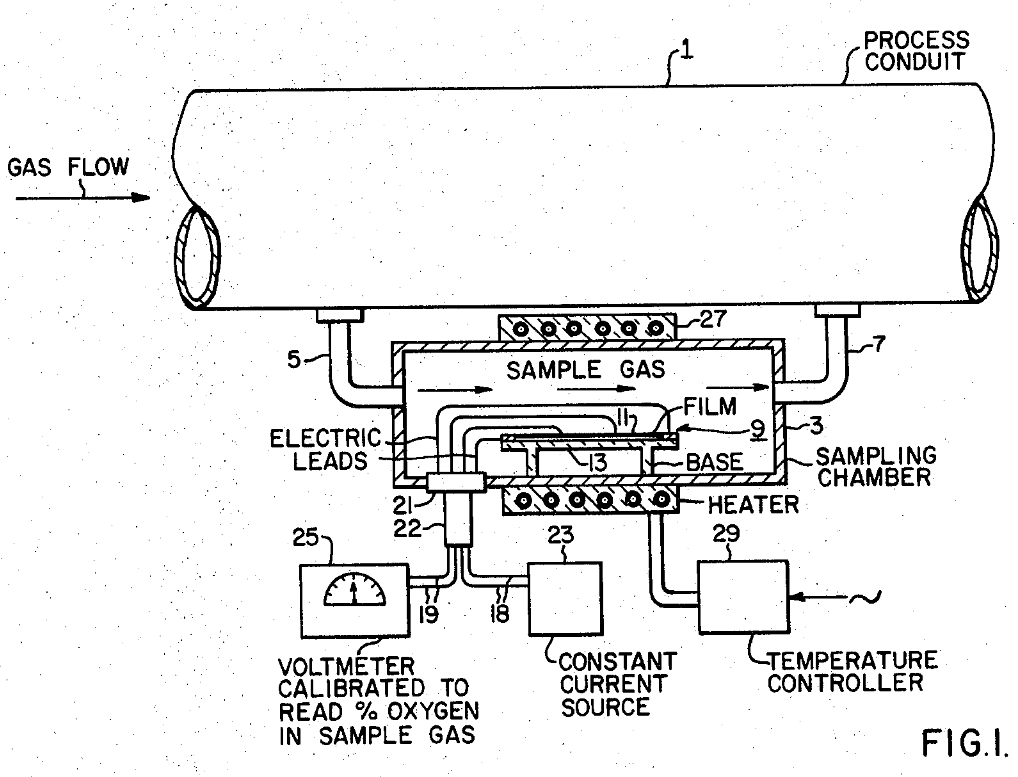
FIG. 1 is a schematic representation of an embodiment of the invention.

In FIG. 1 of the drawing there is illustrated an embodiment of oxygen partial pressure measuring transducer 9 for measuring the oxygen content of a gas flowing in process conduit 1. Measuring transducer 9 is mounted in sampling chamber 3 and exposed to the flow of sample process gas entering chamber 3 through inlet tubing 5 and leaving chamber 3 through exhaust tubing 7.

Measuring transducer 9 is comprised of a thin film 11 of a mixed valence oxide compound which exhibits a change in electrical resistance as a function of a change in the oxygen partial pressure of the sample gas. The film 11 is deposited on an inert, high resistance ceramic base 13 by any of several well known methods including the process known as radio frequency sputtering. Inasmuch as the methods of depositing are well known and do not constitute a part of the invention further discussion of the various methods is not considered necessary.

The selection of the mixed valence oxide compound is determined by the pressure-resistivity characteristics desired and the range of partial pressures to be measured.

The mixed valence oxide compound strontium iron oxide ($SrFeO_{3-x}$), in addition to exhibiting suitable pressure-resistivity characteristics provides rapid ionic diffusion and reversible response to changes in oxygen partial pressure of the sample gas due to the wide oxygen composition range of this compound. Although $SrFeO_{3-x}$ represents a desirable oxygen sensitive compound a substitution of equivalents, such as one of the alkaline earth metals, barium or calcium for the strontium, and one of the first transition series elements manganese, cobalt or nickel for the iron, will also produce useful oxygen sensitive resistance elements.

While the pressure-resistivity characteristic of compounds is generally well known, the application of this characteristic as the principle of operation of an oxygen sensor has not been successful due to the unacceptable response times of such compounds. The application of a mixed valence oxide compound, of which strontium iron oxide is one, results in an oxygen sensor which provides rapid response to changes in oxygen pressure of the measured gas. A primary factor that contributes to the success of strontium iron oxide is the wide oxygen stoichiometry range of this compound. This characteristic provides a large number of oxygen vacancies which in turn provide a relatively open diffusion path for oxygen ions present in the sample gas. The capacity to readily diffuse oxygen ions through the entire structure of the sensing film results in a rapid change in the resistivity of the film in response to a change in oxygen content of the measured gas. This change in resistivity is then measured by an external electrical circuit in the form of an electrical signal.

The resistivity of the strontium iron oxide film 11 varies as a function of temperature and the oxygen content of the sample gas between a relatively high value of resistivity at vacuum conditions, wherein the composition is approximately $SrFeO_{2.5}$, and a low resistivity value at a high pressure limit wherein the composition is approximately $SrFeO_3$. The composition change of the sensing film 11 represents a transition between trivalent iron in the low oxygen pressure condition and tetravalent iron in the high oxygen pressure condition. This wide range of mixed valence results in a wide sensor resistivity range and desirable sensor measurement resolution.

In the $SrFeO_{3-x}$ compound the oxidized and reduced forms have different crystal structures. The structure change or phase change takes place with an intervening two phase region in which the oxygen partial pressure is not thermodynamically defined as a function of the resistance or composition. Difficulty may therefore be met in using the gauge at temperatures and oxygen partial pressures which correspond to a two phase region for the resistance element. If, for example, the temperature is 700° C. and the oxygen pressure is 1 Torr the average composition will be about $SrFeO_{2.6}$, and the oxide system will be in a two phase region between the $SrFeO_3$ perovskite-like structure and $SrFeO_{2.5}$ Brownmillerite type structure.

It is well known that phases may be stabilized by substitution of minor amounts of elements into the crystal lattice. It is thus anticipated and the phase change in the $SrFeO_{3-x}$ system may be prevented by suitable lattice substitution. For example the substitution of an oxide element such as a rare earth oxide including lanthanum and yttrium oxides in place of a portion of the iron could be useful for this purpose.

The oxygen vacancy structure described above exhibits rapid reversible oxidation-reduction in response to increases and decreases in the oxygen pressure. Of further significance is the fact that the reversibility of the sensor is achievable at temperatures as low as 350° C.

An equally important feature of the mixed valence compound is that the presence of small amounts of impurities in the elements of the compound or in the sample gas does not affect the resistivity range of the sensing element 9. The presence of an equally small amount of impurities could however appreciably effect a compound of relatively few oxygen vacancies. Therefore as a consequence of the wide oxygen composition range of a mixed valence oxide compound and the resulting insensitivity to impurities, the need for utilizing only high purity strontium and iron oxides is eliminated thereby reducing the cost and the efforts involved in fabricating and operating the sensing element.

It is recalled that in addition to exhibiting a change in resistivity in response to change in oxygen pressure, the resistivity of the compound is also sensitive to temperature fluctuation. Therefore in order to measure the compound resistivity change as a direct indication of oxygen pressure it is necessary to maintain the sensing film 11 of FIG. 1 at a constant elevated temperature sufficient to insure rapid response.

Figure 2:
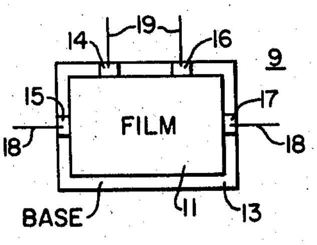
FIG. 2 is a top view of the oxygen sensing element and ceramic support illustrating electrode connections to the sensing element.

The mixed valence oxide sensing element 9 depicted in FIG. 2 illustrates the use of a four electrode excitation and measuring circuit. Electrodes 14, 15, 16 and 17 are made of platinum which is diffused in the surface of ceramic base 13 in contact with sensing film 11. Electrical leads 18 attached to electrodes 15 and 17 are terminated at the constant current source 23 as shown in FIG. 1. Electrical leads 19 are attached to electrodes 14 and 16 and terminated at voltmeter 25. Voltmeter 25 is calibrated to represent a change in voltage produced by a change in sensing film resistance as a direct measurement of oxygen content of the sample gas. This electrode configuration is typical and is in no way limiting.

Heater 27 is provided to maintain the temperature of sensing film 11 at a value which is preset at temperature controller 29. Resistance changes caused by minor temperature fluctuations could be compensated for by using a bridge arrangement as the measuring circuit with an element exhibiting a similar temperature coefficient of resistance but which is insensitive to changes in oxygen pressure. Such an element could be $SrFeO_{3-x}$ which has been encapsulated to isolate it from changes in oxygen pressure but not from temperature fluctuation.

While a gas flow control device is not shown, it is acknowledged that an excess gas flow rate would tend to cool the sensing film 11 and thereby alter the resistivity of the film. Therefore it may be necessary to include a flow control device if substantial changes in gas flow rate are expected.

The embodiment of FIG. 1 illustrates the use of a bypass sampling chamber 3 for measuring sample gas oxygen content. It is apparent that the sensor 9 and the necessary heating element could be inserted directly in process conduit 1 as an in situ application.

Furthermore while the sensor is represented by a thin film which established a short diffusion path for oxygen in the oxide and promotes fast response of the sensor 9 to oxygen pressure changes, a less thin sensing surface could be utilized and exhibit an equally short diffusion path and the same fast response if it were sufficiently porous.

The increased porosity would promote rapid diffusion of oxygen through the sensing element.

While a particular embodiment of the invention has been described it should be understood that the present disclosure has been made only by way of example and that numerous changes in the details of construction and arrangement of parts, elements and components can be resorted to without departing from the scope and spirit of the present invention.

What we claim is:

1. A solid state oxygen sensor exhibiting a change in electrical resistance as a function of oxygen partial pressure of a gas, comprising a sensing element exhibiting a range of oxygen composition, said element responding to a change in the oxygen partial pressure of the gas by changing electrical resistivity.

2. A solid state oxygen sensor as claimed in claim 1 including an electrical contact means associated with said sensing element, and an electrical circuit connected to said sensing element through said contact means to develop an output signal representing the oxygen partial pressure of the gas as a function of the resistivity of the sensing element.

3. A solid state oxygen sensor as claimed in claim 1 further including means for maintaining said sensing element at a temperature sufficient to promote a desirable oxygen diffusion rate in said sensing element.

4. A solid state oxygen sensor as claimed in claim 1 wherein said sensing element is comprised of a mixed valence oxide compound.

5. A solid state oxygen sensor as claimed in claim 4 wherein said mixed valence oxide element is in the form of a thin film deposited on a substrate which acts as an electrical insulator.

6. A solid state oxygen sensor as claimed in claim 4 wherein said mixed valence oxide element is a self-supporting porous structure.

7. A solid state oxygen sensor as claimed in claim 4 wherein said mixed valence oxide compound is comprised of a composition of an alkaline earth element and a first transition series element.

8. A solid state oxygen sensor as claimed in claim 7 wherein said alkaline earth elements include strontium, barium and calcium.

9. A solid state oxygen sensor as claimed in claim 7 wherein said first transition series elements include iron, manganese, cobalt and nickel.

10. A solid state oxygen sensor as claimed in claim 7 wherein said mixed valence oxide compound includes a stabilizing oxide element such as a rare earth oxide including lanthanum and yttrium oxides.

References Cited

UNITED STATES PATENTS 3,138,948 6/1964 Pfefferle ............ 73—27

OTHER REFERENCES

Seiyama et al.: Anal. Chem. 38, No. 8, July 1966, 1069–1073.

MORRIS O. WOLK, Primary Examiner

R. M. REESE, Assistant Examiner

U.S. Cl. X.R.

23—232; 73—27; 324—30